United States Patent [19]

Sato

[11] E Patent Number: Re. 31,996

[45] Reissued Date of Patent: Oct. 1, 1985

[54] TRAVELING WAVE TUBE DEVICES

[75] Inventor: Hisaaki Sato, Tokyo, Japan

[73] Assignee: Nippon Electric Co., Ltd., Japan

[21] Appl. No.: 427,482

[22] Filed: Sep. 29, 1982

Related U.S. Patent Documents

Reissue of:

[64] Patent No.: 4,333,038
Issued: Jun. 1, 1982
Appl. No.: 137,799
Filed: Apr. 7, 1980

[30] Foreign Application Priority Data

Apr. 11, 1979 [JP] Japan ..... 54/44027
Apr. 13, 1979 [JP] Japan ..... 54/45723

[51] Int. Cl.[4] ..... H01J 25/34

[52] U.S. Cl. ..... 315/3.5; 315/3.6; 315/5.35; 315/5.36; 315/39.53

[58] Field of Search ..... 315/3.5, 3.6, 5.35, 315/5.38, 39.53

[56] References Cited

U.S. PATENT DOCUMENTS 3,310,704 3/1967 Symons et al. ..... 315/3.5
3,355,622 11/1967 Bradford ..... 315/3.5
3,441,783 4/1969 Harris et al. ..... 315/3.5
3,532,925 10/1970 Dodge et al. ..... 315/3.5
3,532,926 10/1970 Winslow ..... 315/3.5
3,796,906 3/1974 Bezy et al. ..... 315/3.5
3,832,593 8/1974 Gross ..... 315/3.5
3,876,901 4/1975 James ..... 315/3.5
4,004,180 1/1977 Gross ..... 315/3.5

*Primary Examiner*—Saxfield Chatmon
*Attorney, Agent, or Firm*—Maurice E. Gauthier

[57] ABSTRACT

In a microwave tube of the type wherein an electron beam emitted by an electron gun is focused and caused to interact with an input high frequency wave at a high frequency circuit unit by magnetic flux generated by a periodic permanent magnet assembly, and the electron beam after the interaction is collected by a collector unit, the portion connected to the output unit of the high frequency circuit unit comprises a column-shaped waveguide member having an end surface comprising a portion of the wall of a cavity at the end of the high frequency circuit unit, the member being bored with a central aperture at the center axis to allow electron beam to pass from the electron gun to the collector unit. A waveguide for guiding the electromagnetic waves from the end surface to the output unit is also provided, and the end surface is shaped like a fan.

10 Claims, 5 Drawing Figures

TRAVELING WAVE TUBE DEVICES

Matter enclosed in heavy brackets [ ] appears in the original patent but forms no part of this reissue specification; matter printed in italics indicates the additions made by reissue.

BACKGROUND OF THE INVENTION

The present invention relates to a traveling wave tube device and, more particularly, to a high power traveling wave tube device wherein a coupled cavity type delay circuit is used as a high frequency circuit unit and a periodic permanent magnet assembly is used as an electron beam focusing unit.

This type of traveling wave tube device comprises an electron gun unit to emit an electron beam, a high frequency circuit unit to amplify a high frequency wave through interaction with the electron beam, a collector unit to catch the electron beam, input/output coupling units to input and output high frequency power to the high frequency circuit unit and a beam focusing unit to focus the electron beam.

The high frequency circuit unit, a coupled cavity type delay circuit, is used for deriving out the high power output, and a periodic permanent magnet (PPM) assembly is used for the beam focusing unit in view of its compact size and its economical and practical advantages.

A known traveling wave tube device of the structure described is, for instance, disclosed in FIG. 31 and its legend appearing on page 58 of "DEVELOPMENT OF A HIGH POWER 12 GHZ PPM FOCUSED TRAVELING WAVE TUBE" published in May, 1975 by NASA Lewis Research Center, Contract NSA3-14391.

While said PPM assembly has the characterizing features explained above, it is defective in the following points. The PPM assembly comprises a plurality of ring shaped magnets disposed in the axial direction of the tube and a plurality of ring-shaped pole pieces interposed between the magnets. The magnets and the pole pieces should be placed as close to the electron beam as possible in order to cause the magnetic field generated by these magnets to act on the electron beam. The electron beam emitted from the electron gun unit should pass the high frequency circuit unit or the drift tubes at a high density in order to prevent the beam from scattering and damage to the high frequency circuit unit. For this purpose, the above mentioned PPM assembly must cover uniformly the whole distance of the high frequency circuit unit disposed between the electron gun unit and the collector unit. However, it is also absolutely necessary for the high frequency circuit unit to be provided with the means for input and output of the high frequency waves. On one hand, designers and manufacturers of the conventional type traveling wave tubes have taken into consideration the problems uniquely observed in the above mentioned PPM structure have offered the beam focusing unit, such as the PPM assembly, independently and separately from the high frequency circuit, such as the coupled cavity type delay circuit, and the input/output coupling units with a considerable characteristic allowances. These units are assembled in the final stage of production with other parts such as the electron gun unit, the collector unit, etc. Any characteristic dispersions are generally corrected by electrical and mechanical adjustments that are subsequently performed in the final stage.

In the conventional type traveling wave tube disclosed in the previously noted publication, portions of magnets or the pole pieces of the PPM assembly covering the high frequency circuit are omitted and waveguides in the input/output coupling unit are coupled to the high frequency circuit unit through the omitted portions. Such structure was quite sufficient for low power output traveling wave tubes. However, this structure was found insufficient high power output traveling wave tubes, for instance, 1 kw at 14 GHZ, as the phenomena to be described later became apparent as a result of the part omitted in the PPM assembly. In the above mentioned structure, the magnetic field intensity on the center axis within the drift tubes near the missing part in the high frequency circuit unit became smaller and eccentric, and the magnetic field distribution on the section crossing perpendicularly with the axis in the drift tubes became non-uniform and eccentric with regard to a certain dimension in the drift tubes. When such a situation appeared, the electron beam passing through the drift tubes became scattered or deviated from the center axis of the drift tubes and impinged upon the wall of the drift tube or its vicinity thereby melting and destroying the portion of the high frequency circuit unit.

In order to overcome such problems, it was proposed to enlarge the magnets near the omitted portion and compensate for the decrease in the magnetic field intensity on the nearby center axis, or to use a different magnetic material with a larger B-H product energy such as a rare earth metal. It is conceivable to correct the eccentric magnetism by leaking the magnetic field where it is intense by attaching a suitable ferromagnetic material to the outer periphery of the magnet.

The above methods, however, are mere extensions of the conventional design concept, and require a great deal of time and skill to arrange the magnetic field intensity of the PPM assembly at a predetermined level.

SUMMARY OF THE INVENTION

It is the object of the present invention to provide a compact and low cost high power traveling wave tube.

Another object of the present invention is to provide a traveling wave tube which is easy to fabricate.

Another object of the present invention is to provide a traveling wave tube with a beam focusing unit which prevents lowering of the magnetic field intensity acting on both ends of a high frequency circuit unit and with less eccentric magnetism.

In their efforts to achieve such objects, the present inventors discarded the conventional concept of designing various function elements separately, and combined them in such a way which obviates the above mentioned difficulties. In the course of their review of the problems, the inventors considered the possibility of removing and heretofore provided omitted part at the end of the PPM assembly in order to join the high frequency circuit unit and the input/output coupling unit for the high frequency power, and also the possibility of coupling the above mentioned high frequency circuit unit with the input/output coupling unit.

According to one embodiment of the present invention, there is provided a traveling wave tube characterized in that it is provided with an electron gun, a high frequency circuit unit comprising a cavity resonator type delay circuit unit coupled thereto, a collector unit disposed on the output side of the high frequency circuit unit and receiving an electron beam, a beam focusing unit disposed adjacent the high frequency circuit unit and causing a periodic magnetic field to act on the electron beam passing the high frequency circuit unit, and input/output units connected to the electron gun side of the high frequency circuit unit and the collector unit side of the high frequency circuit unit. The portion of the traveling wave tube that is connected to the output unit of the high frequency circuit unit comprises a column-shaped waveguide member having an end surface forming a portion of the wall of the cavity at the end of the high frequency circuit unit, the member being bored with a center aperture at its axial center to allow passing of electron beam sent toward the collector unit from the electron beam, and the portion connected to the output unit is provided with a waveguide for transmitting the electromagnetic waves from the end surface to the output unit, the end face of the last waveguide being fan-shaped.

DESCRIPTION OF THE PREFERRED EMBODIMENTS

Figure 1:
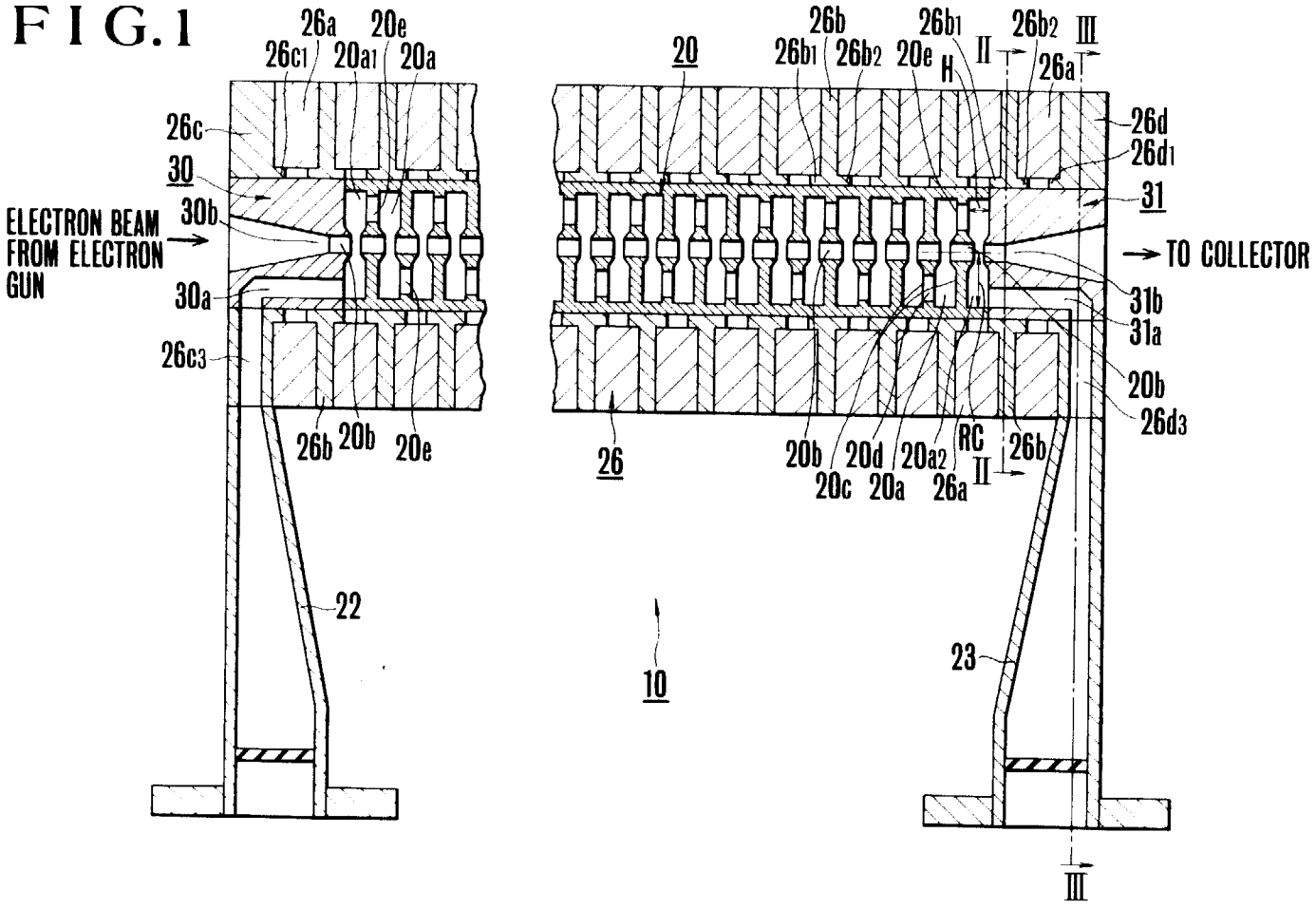
FIG. 1 is a cross-sectional drawing showing major parts of a traveling wave tube embodying the present invention.

FIG. 1 is a cross-sectional view of a traveling wave tube 10 embodying the present invention, and shows a high frequency circuit unit 20, input/output coupling units 22, 23, and a beam focusing unit or a periodic permanent magnet (PPM) assembly 26 which are directly concerned with the present invention.

An electron gun unit (not shown) of a known structure, which is disposed on the left hand side of the high frequency circuit unit 20 in FIG. 1, emits an electron beam toward the high frequency circuit unit, a collector unit (not shown) which is disposed on the right hand side of the circuit 20, receives the electron beam from the electron gun unit passing through the high frequency circuit unit.

In the drawing, the high frequency circuit unit 20 is comprised of a coupled cavity type delay circuit that is suitable for high power output and includes a plurality of cavities 20a that are axially aligned, the circuit being composed of a metallic material such as Cu. A passage for electron beam or drift tubes 20b is formed on the axis, the passage leading the electron beam emitted from the electron gun to the collector unit. There are also provided connecting apertures 20d, 20e to join the adjacent cavities on the side walls 20c of the respective cavities 20a. In the embodiment shown, the connecting apertures 20d and 20e are formed symmetrically with respect to the axis. At the end of the extreme left or closest to the electron gun and at the extreme right or closest to the collector, cavities 20a are provided with column-shaped waveguide parts 30, 31 which form fan-shaped waveguides 30a, 31a. One end of the waveguide parts 30, 31 forms one wall of the cavities $\mathbf{20a_1}$, $\mathbf{20a_2}$ located at the extreme left and the extreme right ends of the high frequency circuit unit while the opposing ends respectively join other waveguides which are disposed perpendicular to them. The fan-shaped wave guides 30a, 31a are adjacent cavities $\mathbf{20a_1}$, $\mathbf{20a_2}$ at open portions thereof, while the other open portions thereof are coupled to the input and the output waveguide tubes 22, 23, respectively, via the waveguide tubes $\mathbf{26c_3}$, $\mathbf{26d_3}$ formed within the pole pieces on which reference will be made later. On the axis are provided apertures 30b and 31b, respectively, which form a part of the drift tubes.

PPM assembly 26 comprises a plurality of ring-shaped permanent magnets 26a and a plurality of ring-shaped pole pieces 26b that are provided outside the cylindrical high frequency circuit unit 20. In this case, the pole pieces 26b are made of, for instance, soft iron, and each has flanges $\mathbf{26b_1}$, $\mathbf{26b_2}$ extending axially on both sides at the inner diameter end. The magnets 26a have an inner diameter of a size which contacts the outer surfaces of the flanges $\mathbf{26b_1}$, $\mathbf{26b_2}$. These magnets 26a and the pole pieces 26b are alternately placed in alignment with the axial direction. At both ends of the PPM assembly 26 are provided pole pieces 26c, 26d having a greater thickness in the axial direction compared to the others. These pole pieces 26c and 26d have the flanges $\mathbf{26c_1}$, $\mathbf{26d_1}$ which have the above mentioned size extending only in the direction where they contact the magnets $\mathbf{26a_1}$, $\mathbf{26a_2}$. The permanent magnets 26a are magnetized in such a way that their poles are in the axial direction and they are so placed that the poles of the same polarity oppose each other in relation to the adjacent magnet. This enables offering of a periodic magnetic field to the electron beam.

Figure 2:
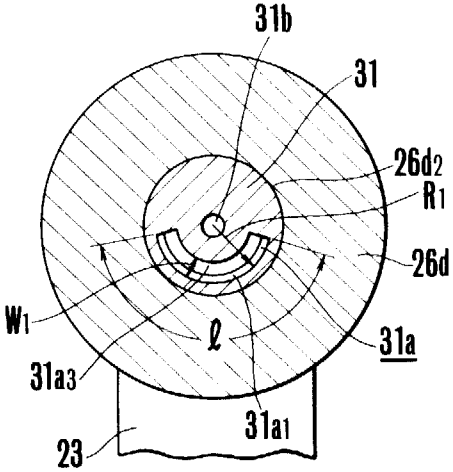
FIG. 2 is a cross-sectional view along the line II—II in FIG. 1.
Figure 3:
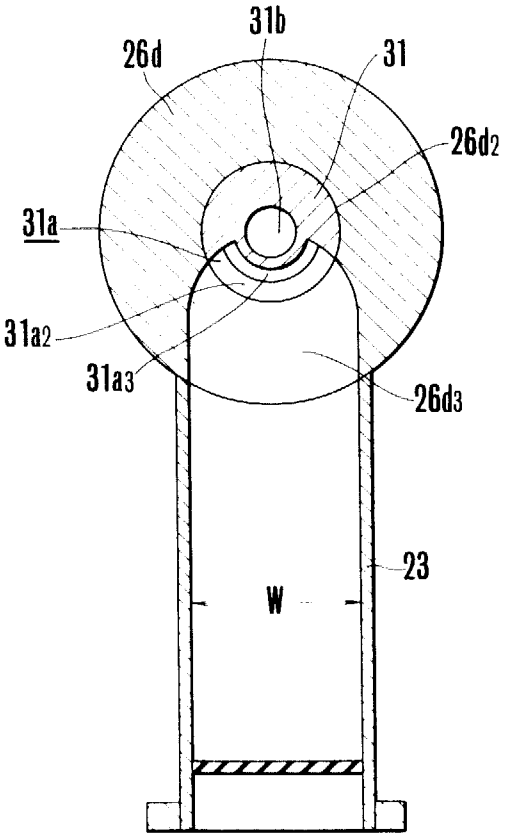
FIG. 3 is a cross-sectional view in the direction along the line III—III of FIG. 1.

The waveguide parts 30, 31 of the above structured traveling wave tube 10, which are characterized by the present invention, are now discussed in further detail. These waveguide parts 30, 31 are identically structured, and the description is made in respect of the waveguide part 31 located on the output side of the high frequency circuit unit 20, reference being made to the FIGS. 2 and 3.

In these drawings the waveguide part 31 has a column-shaped outer periphery and is inserted into an aperture $\mathbf{26d_2}$ bored through the center of the ring-shaped pole piece 26d. On the waveguide part 31 is formed an aperture 31b which comprises a part of the drift tubes 20b in the axial direction. At the portion facing the cavity $\mathbf{20a_2}$, the aperture 31b has a diameter which is substantially the same as that of the aperture provided on the partition to form other center cavities, but is inversely tapered so that the diameter increases toward the collector. As mentiond above, on the waveguide part 31 is formed a fan-shaped waveguide 31a. The waveguide 31a comprises roughly two portions; the first portion $\mathbf{31a_1}$ having a cross section shaped like a fan and disposed in the axial direction, the opening of the portion 31a facing the cavity $\mathbf{20a_2}$ is shaped like a fan, and the second portion $\mathbf{31a_2}$ having a cross section shaped like a rectangle and opening to the column side of the waveguide part 31. The first portion $\mathbf{31a_1}$ and the second portion $\mathbf{31a_2}$ are so coupled that there is formed a cone-shaped taper portion $\mathbf{31a_3}$ at the corner of their juncture. The portion $\mathbf{31a_3}$ takes the impedance matching between the two as in the case of the ordinary corner waveguide and functions to efficiently send the electromagnetic wave from the first portion to the second portion.

The opening of the second portion $31a_2$ of the waveguide 31 faces the opening of the inner diameter of the inversely tapered waveguide $26d_3$ having the rectangular cross section formed radially inside the pole piece 26d. The tapered waveguide tube $26d_3$ increases its diameter toward the outside and connects to the output waveguide tube 23 from the aperture bored at the outer diameter end. The pole piece 26d disposed at the right end side of the PPM assembly 26 is different from other pole pieces in that the restrictions imposed on its thickness are mitigated radically, so that boring the waveguide inside the pieces presents no problems. However, it is still necessary to open it to a degree that no magnetic saturation occurs within the pole piece.

The relation between the cross section of the fan shaped wave guide 31a and the cavity $26a_2$ is now discussed where the following relations are formed:

$$R_1 = R_c$$

$$W_1 = H$$

wherein $R_1$ is the outer radius of the fan of the waveguide $31a_1$, $W_1$ is the difference between the outer radius and the inner radius, or the width of the fan-shaped waveguide, $R_c$ is the inner diameter of the cavity $26a_2$, and H is the height of the cavity $26a_2$, or the length in the axial direction.

The length l of the fan shaped waveguide $31a_1$ in the circumferential direction is determined to be substantially equal to the standard waveguide tube in the operating frequency range of the traveling wave tube to be fabricated, or the lateral width W of the rectangular output waveguide 23. This is because the length l in the circumferential direction contributes in determining the cut off frequency as in the case of the standard waveguide.

In the high frequency coupling structure as above mentioned, the waveguide for coupling does not need to cross the magnets, so that the problems of the lowered magnetic field intensity or eccentric magnetism caused by the magnet or the pole piece omissions are completely eliminated, and various difficulties encountered in the conventional art are remarkably alleviated. As there is no special need to control the size of the PPM assembly, it is possible to obtain a small sized and therefore low cost traveling wave tube for a high power. This also decreases the weight of the traveling wave tube so that it may be installed on a satellite or a vehicle. The improvement obtained in the high frequency matching of the coupling portions over that obtained in the conventional structure has also been experimentally confirmed.

Figure 5:
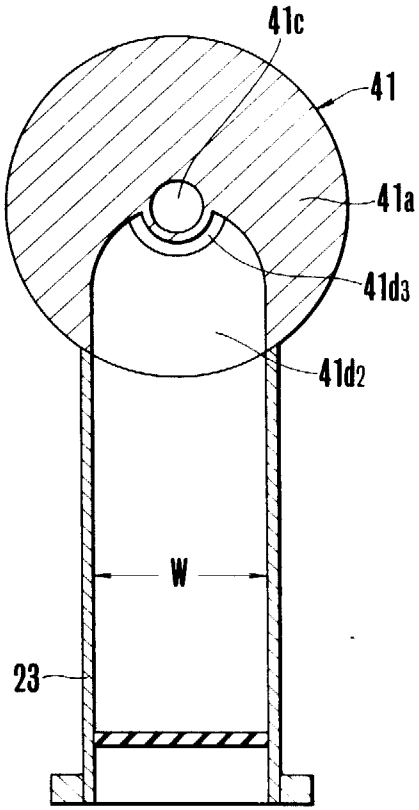
FIG. 5 is a cross-sectional view along the line V—V of FIG. 4.
Figure 4:
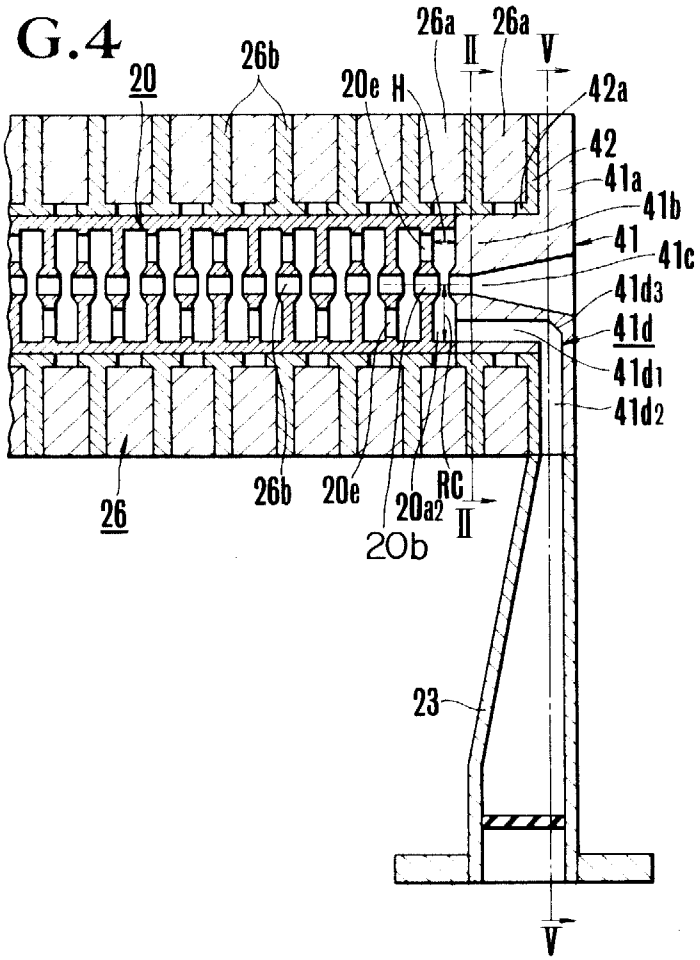
FIG. 4 is a cross-sectional view of the main part of another embodiment of the traveling wave tube in accordance with the present invention.

FIGS. 4 and 5 show another embodiment of the present invention traveling wave tube, and more particularly they show the portion where the high frequency circuit unit and the output waveguide as they are joined together. The difference between these drawings and FIGS. 1 to 3 lie in the structures of the waveguide part 41 comprising one of the partition walls of the cavity $20a_2$ formed at the extreme right end of the high frequency circuit unit 20 and the pole piece 42 disposed at the extreme right end of the PPM assembly 26. That is, the waveguide part 41 comprises a first column part 41a having substantially the same outer diameter as the PPM assembly 26 and a comparatively thick wall, and a second column part 41b extending in one direction from the center of the said column part 41a. Midway between the first and the second column parts 41a and 41b there is an aperture 41c which comprises a portion of the drift tubes 20b. As shown in the embodiment already described heretofore, the aperture 41c at the portion facing the cavity $20a_2$ has the same diameter as the partition wall of the other cavity and is tapered in such a way that its diameter increases toward the collector unit. There is further formed a fan-shaped waveguide 41d at the first and the second column parts 41a, 41b. This waveguide 41d comprises the first and the second parts $41d_1$ and $41d_2$, the first part $41d_1$ facing the cavity $20a_2$ at one end and having a fan-shaped opening. The first waveguide part $41d_1$ is formed parallel to the axis, with the same cross section as that shown in FIG. 2, and the dimensions for the fan shape also being determined in the manner similar to the first embodiment.

The second waveguide part $41d_2$ is formed in a direction substantially perpendicular to the said first part and joined thereto, and opens toward the column side of the first column part 41a, which has a rectangular cross section and is inversely tapered from its joint to the first part 41d toward the opening of the second waveguide portion $41d_2$.

At the corner where the first waveguide part $41d_1$ and the second waveguide part $41d_2$ are joined, there is formed a tapered cone part $41d_3$. The reason for this provision is the same as that for the tapered part $31a_3$ of the embodiment mentioned above. The output waveguide 23 is further connected to the opening of the second waveguide $41d_2$.

The pole piece 42 at the extreme right end of the present embodiment is shaped like a ring, and its thickness is the same or somewhat thinner than that of the other pole pieces, and is provided with a projection 42a on the side facing the magnet 26a at the extreme right. It should be noted that the cross section along the line II—II near the cavities of the waveguide part in FIG. 4 is the same as that of FIG. 2.

In this case, the outer radius $R_1$ of the portions facing the cavity of the fan-shaped waveguide is also substantially the same as the radius $R_c$ of the aforementioned cavity, and the fan width $W_1$ is substantially the same to the cavity height H, while the length l of the fan in the circumferential direction is selected to be substantially the same to the lateral width of the standard waveguide in the operating frequency zone of the traveling wave tube.

Even with the structure as above described, there is no need for the waveguide to cross any pole pieces or magnets at the input and output coupling portion, so that problems like lowered magnetic field or eccentric magnetism caused by partial omissions of the magnets or pole pieces, and all the other various difficulties encountered in the conventional art are remarkably lessened.

It is axiomatic that the present invention is not to be limited to the aforementioned embodiments, but that many applications and variations thereof are conceivable. For instance, although the input/output coupling units to the high frequency circuit unit shown in FIG. 1 were given the identical structure, the purposes of the present invention are still fully achieved by applying the present invention to the output side only which is more susceptible to the influences of the magnetic field intensity or magnetic field distribution.

The second waveguide part $41d_2$ was made up by the first portion 41a of the waveguide part 41 and one face of the pole piece 42 in the second embodiment shown in FIG. 4, it would be easily seen that the second waveguide may completely embedded in the first portion 41a.

Although each of the embodiments of the present invention was made up of the first and the second waveguides crossing perpendicularly the fan-shaped waveguide consisting of the waveguide parts, it is possible to incline the fan-shaped waveguide in the direction away from the axis of the part where the cavity contacts one opening, and to make up one waveguide facing the side where the other opening faces the side surface of the column-shaped waveguide part.

What is claimed is:

1. In a traveling wave tube of the type provided with an electron gun, a high frequency circuit unit connected thereto and comprising a cavity resonator type delay circuit unit, a collector unit disposed on the output side of the said high frequency circuit unit and adapted to receive an electron beam sent via said high frequency circuit unit, a beam focusing unit disposed adjacent to said high frequency circuit unit and adapted to cause a periodic magnetic field to act upon the electron beam passing through the high frequency circuit unit, and input/output units connected to the electron gun side of said high frequency circuit unit and the end portion of the collector unit side, a waveguide portion connected to the output unit of said high frequency circuit unit comprises a column-shaped waveguide member having an end surface forming a portion of the wall of a cavity at the end of the high frequency circuit unit, said member being bored with a central aperture at a central axis to allow the passage of the electron beam from the electron gun to the collector unit, said central aperture is tapered and its diameter increases towards the collector unit, and a waveguide for transmitting the electromagnetic waves from said end surface to the output unit, said end surface of the waveguide being shaped like a fan.

2. The traveling wave tube according to claim 1 wherein said beam focusing unit is composed of ring shaped permanent magnets magnetized in the axial direction and ring shaped pole pieces, said magnets and pole pieces being alternately disposed, and wherein the pole piece disposed at the end closest to the collector unit includes the waveguide which connects an opening of the fan-shaped waveguide which is opened on the side face of said waveguide member with the output unit.

3. The traveling wave tube according to claim 1 wherein a rectangular waveguide is provided within the pole piece, said rectangular waveguide being inversely tapered toward the direction of the output unit from the opening of said fan-shaped waveguide.

4. The traveling wave tube according to claim 1 wherein a waveguide portion joined to the input unit of said high frequency circuit unit comprises a second column-shaped waveguide member having an end surface forming a portion of the wall of a cavity at the end of the high frequency circuit unit, said second waveguide member being bored with a central aperture through which the electron beam passes from the electron gun toward the collector unit, and wherein there is further provided a waveguide to guide the electromagnetic waves from the input unit to the end surface of said second waveguide member, said end surface of said second waveguide member being shaped like a fan.

5. The traveling wave tube according to claim 1 wherein the said column-shaped waveguide member comprises a first column part disposed adjacent to the end of the PPM assembly, and a second column part having an end surface that forms a portion of the wall of a cavity at the end of the high frequency circuit unit, said first column part having a larger diameter than said second column part, a fan-shaped waveguide formed on the first and the second column parts, the output unit being connected to the opening of a fan-shaped waveguide bored on the side face of the second column part.

6. The traveling wave tube according to claim 2 or 3 or 5 wherein the fan-shaped waveguide provided on said waveguide member comprises a first part having a fan-shaped cross section that is formed in a direction parallel to the axis from the wall of a cavity at the end of said high frequency circuit unit and a second part connected to the end of the first portion and reaching the side face of the waveguide member as it extends in the direction perpendicular to the axis.

7. The traveling wave tube according to claim 6 wherein the second portion has a cross section which is rectangular and inversely tapered toward the side face of the waveguide member.

8. The traveling wave tube according to claim 1 or 2 or 3 or 4 or 5 wherein the outer radius of the end surface facing a cavity of the fan-shaped waveguide is equal to the inner diameter of the cavity, and the width of the said fan-shaped waveguide is equal to the height of the cavity.

9. The traveling wave tube according to claim 8 wherein the length of the fan-shaped waveguide in the circumferential direction is equal to the lateral width of the rectangular waveguide comprising the output device in the operation frequency range of the traveling wave tube.

10. The traveling wave tube according to claim 1 including a second waveguide portion connected to the input unit of said high frequency circuit unit, said second waveguide portion including a column-shaped waveguide member having an end surface forming a portion of the wall of a cavity at the end of the high frequency circuit unit, said column-shaped waveguide member of said second waveguide portion is formed with a tapered central aperture through which the electron beam passes from the electron gun toward the collector unit, the diameter of said central aperture of said second waveguide portion increasing toward the collector unit.

* * * * *